(12) United States Patent
Hwang (10) Patent No.: US 10,151,369 B2
(45) Date of Patent: Dec. 11, 2018

(54) WIRE CONNECTOR AND PISTON ASSEMBLY FOR DAMPER INCLUDING THE SAME

(71) Applicant: MANDO CORPORATION, Pyeongtaek-si, Gyeonggi-do (KR)

(72) Inventor: Myeong Su Hwang, Suwon-si (KR)

(73) Assignee: MANDO CORPORATION, Pyeongtaek-si, Gyeonggi-do, do (KR)

( * ) Notice: Subject to any disclaimer, the term of this patent is extended or adjusted under 35 U.S.C. 154(b) by 0 days.

(21) Appl. No.: 15/825,759

(22) Filed: Nov. 29, 2017

(65) Prior Publication Data

US 2018/0163812 A1    Jun. 14, 2018

(30) Foreign Application Priority Data

Dec. 13, 2016    (KR) .................. 10-2016-0169882

(51) Int. Cl.
*H01R 13/625* (2006.01)
*F16F 9/46* (2006.01)
*B60R 16/02* (2006.01)
*B60R 16/03* (2006.01)
*H01R 13/631* (2006.01)
(Continued)

(52) U.S. Cl.
CPC .............. *F16F 9/463* (2013.01); *B60R 16/02* (2013.01); *B60R 16/0207* (2013.01); *B60R 16/03* (2013.01); *F16F 9/02* (2013.01); *F16F 9/32* (2013.01); *F16F 9/46* (2013.01); *H01R 13/20* (2013.01); *H01R 13/631* (2013.01); *B60G 17/015* (2013.01); *B60G 2204/2022* (2013.01); *H01R 13/627* (2013.01);
(Continued)

(58) Field of Classification Search
CPC .............................. H01R 13/6315; F16F 9/463
USPC ........................................... 439/34, 247, 248
See application file for complete search history.

(56) References Cited

U.S. PATENT DOCUMENTS 2,939,102 A * 5/1960 Johnson ............... H01R 13/635
                                                            439/154
3,755,771 A * 8/1973 Brush .................. H01R 13/629
                                                            439/248
(Continued)

FOREIGN PATENT DOCUMENTS

KR    10-2005-0103876 A    11/2005
KR    10-2009-0050466 A    5/2009

*Primary Examiner* — Neil Abrams
(74) *Attorney, Agent, or Firm* — McDermott Will & Emery LLP (57) ABSTRACT

A piston assembly for a damper includes: a piston head; a piston rod having one end connected to the piston head, forming an inner space therein, and having another end at which an opening communicating with the inner space is formed; a wire having one end connected to an electric device mounted on the piston head and extending through the inner space of the piston rod; and a connector disposed at the other end of the piston rod and connected to another end of the wire. The connector includes a socket part rotatably disposed in the opening at the other end of the piston rod, and a plug part inserted into the socket through the opening of the other end of the piston rod. A self-alignment structure is provided in the socket part and the plug part and is configured to rotate the socket part such that the socket part is aligned at a predetermined orientation with respect to the plug part when the plug part is inserted into the socket part.

8 Claims, 4 Drawing Sheets

(51) Int. Cl.
 F16F 9/02 (2006.01)
 F16F 9/32 (2006.01)
 H01R 13/20 (2006.01)
 B60G 17/015 (2006.01)
 H01R 13/627 (2006.01)
 H01R 103/00 (2006.01)
 H01R 24/00 (2011.01)

(52) U.S. Cl.
 CPC ........ *H01R 13/6315* (2013.01); *H01R 24/005* (2013.01); *H01R 2103/00* (2013.01); *H01R 2201/26* (2013.01)

(56) References Cited

U.S. PATENT DOCUMENTS

| | | | | |
|---|---|---|---|---|
| 4,209,891 A | * | 7/1980 | Lamb | E21B 33/038 166/341 |
| 4,239,325 A | * | 12/1980 | Tyson | H01R 13/64 439/314 |
| 4,660,688 A | * | 4/1987 | Spisak | F16F 9/463 174/81 |
| 4,789,343 A | * | 12/1988 | Dougherty | B60G 17/015 439/34 |
| 4,802,861 A | * | 2/1989 | Gaston | H01R 13/631 285/24 |
| 4,846,318 A | * | 7/1989 | Groves | B60G 17/0408 188/282.2 |
| 5,022,865 A | * | 6/1991 | Wright | H01R 13/5202 439/279 |
| 5,090,524 A | * | 2/1992 | Miller | B60G 17/0408 188/266.2 |
| 5,106,307 A | * | 4/1992 | Mouissie | H01R 13/64 188/282.2 |
| 6,007,345 A | * | 12/1999 | Francis | F16F 9/463 439/34 |
| 6,036,500 A | * | 3/2000 | Francis | F16F 9/463 439/34 |
| 6,345,706 B1 | * | 2/2002 | Oliver | F16F 9/463 188/267.2 |
| 6,379,162 B1 | * | 4/2002 | Raypole | H01R 33/7664 188/282.2 |
| 6,607,393 B2 | * | 8/2003 | Raypole | H01R 33/7664 439/347 |
| 6,758,687 B2 | * | 7/2004 | Raypole | H01R 33/7664 439/92 |
| 7,293,633 B2 | * | 11/2007 | Lun | F16F 9/0281 188/267.2 |
| 7,794,288 B2 | * | 9/2010 | Shindo | H01R 13/533 439/347 |
| 8,011,942 B2 | * | 9/2011 | Ohmori | H01R 13/6315 439/314 |
| 9,325,113 B2 | * | 4/2016 | Pankau | H01R 13/6272 |
| 9,431,752 B2 | * | 8/2016 | Sekino | H01R 13/506 |
| 9,502,833 B2 | * | 11/2016 | Sekino | H01R 13/62905 |
| 9,525,239 B2 | * | 12/2016 | Shinmi | H01R 13/6315 |
| 2018/0163812 A1 | * | 6/2018 | Hwang | H01R 13/631 |

\* cited by examiner

WIRE CONNECTOR AND PISTON ASSEMBLY FOR DAMPER INCLUDING THE SAME

CROSS-REFERENCE(S) TO RELATED APPLICATION

This application claims the benefit of Korean Patent Application No. 10-2016-0169882, filed on Dec. 13, 2016, in the Korean Intellectual Property Office, the disclosure of which is incorporated herein in its entirety by reference.

BACKGROUND OF THE INVENTION

Field of the Invention

The present invention relates to a wire connector for connecting an electric device inside a damper to an electric device outside the damper through a piston rod of a damper, and more particularly, to a wire connector for a damper, which can be easily connected to an end of a piston rod and can be positioned at a extension direction determined by an operator, and a piston assembly for a damper including the same.

Description of the Related Art

In general, a damper is a device attached to a suspension system of a vehicle to attenuate or reduce vibration or shock generated during traveling of the vehicle, and is widely used to improve ride comfort and increase driving stability.

In particular, the use of a variable damper which can further improve ride comfort and driving stability of the vehicle by appropriately adjusting a damping force of the damper according to the driving condition of the vehicle has become common.

In the case of the damping force variable damper, an electric wire for supplying electric current is connected to an electric device inside the damper, for example, a solenoid of a valve constituting a piston assembly, and extends outward through an inner space of a piston rod.

Figure 1:
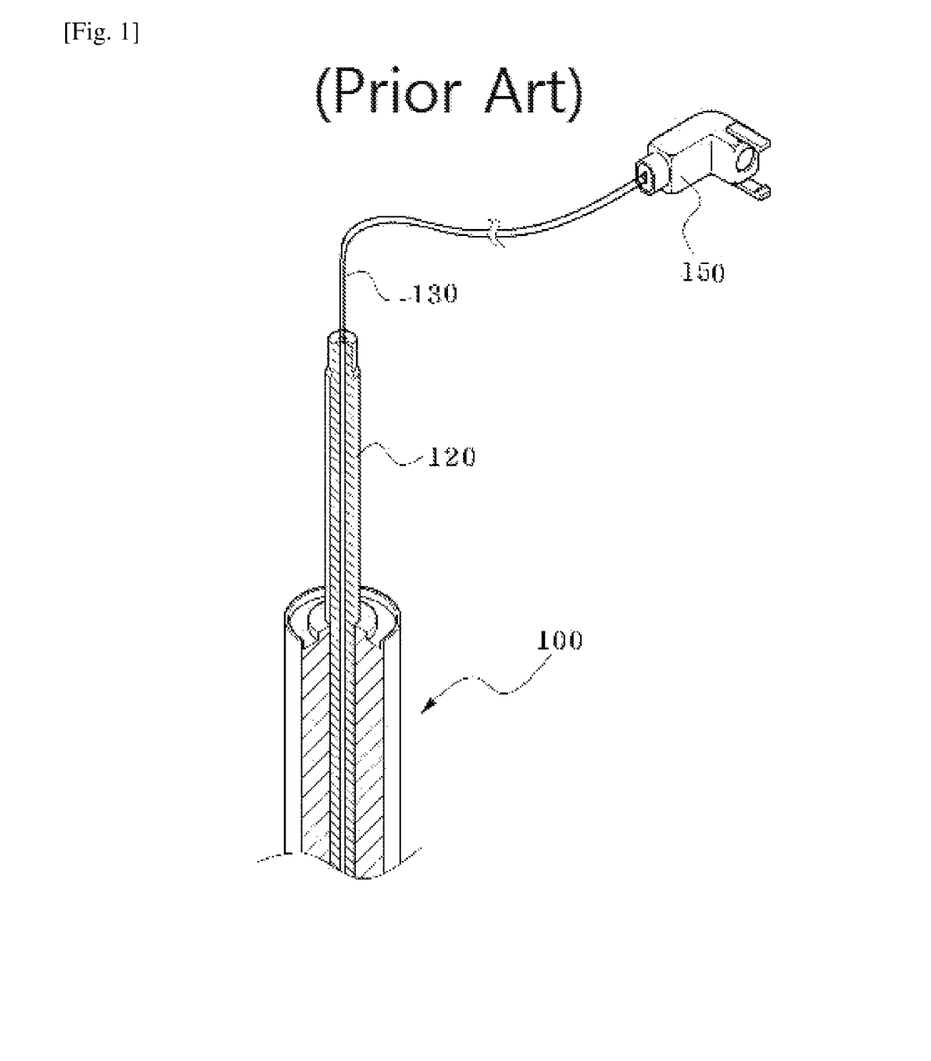
FIG. 1 is a perspective view of a conventional wire connector for a damper.

FIG. 1 illustrates a configuration of a conventional damping force variable damper in which a current supply line for supplying electric current to a coil for forming a magnetic field around a passage of a piston assembly extends outward through an inner space of a piston rod.

That is, the conventional damping force variable damper 100 includes a wire 130 that extends outward from a damper 100 through a piston rod 120 extending outward from one end of a cylinder and delivers electric current from a controller (ECU) (not shown) outside the damper 100 to an electric device (e.g., a coil) of a piston head (not shown) inside the damper 100.

A connector 150 is provided at one end of the wire 130 so as to connect to the controller provided outside the damper 100.

However, the wire and the connector for the supply of the current, which are used in the conventional damping force variable damper, extend over a long distance from the piston rod 120, which may cause interference with a damper mounting operation.

In addition, when defects such as disconnection or the like due to external shock occur in an exposed portion of the wire extending outward from the piston rod 120, it is troublesome to remove a defective wire from the piston assembly and connect a normal wire again to the piston assembly. That is, while a portion of the wire inside the piston rod is hardly damaged by external influence, there is a risk that another portion of the wire extending outward from the piston rod may be damaged by external influence. Thus, the portion of the wire extending outward from the piston rod must be able to be easily connected to the portion of the wire extending through the piston rod and must be able to be easily disconnected therefrom.

Meanwhile, when the wire portion extending outward from the piston rod and another wire portion extending through the piston rod are connected to or disconnected from each other, the connection and disconnection operations must be able to be performed quickly and easily in consideration of a narrow space in which the damper is mounted. In addition, an extending orientation of the wire extending outward from the end of the piston rod must be able to be freely selected.

PRIOR ART DOCUMENTS

Patent Document

Korean Patent Application Publication No. 10-2005-0103876 (2005 Nov. 1)
Korean Patent Application Publication No. 10-2009-0050466 (2009 May 20)
U.S. Patent Publication No. 2003/0143892 (2003 Jul. 31)

SUMMARY OF THE INVENTION

The present invention has been made in an effort to solve the problems described above, and provides a wire connector, which can be easily connected to an end of a piston rod and can be positioned at a position determined at the end of the piston rod by an operator, and a piston assembly for a damper including the same.

According to an embodiment of the present invention, a piston assembly for a damper includes: a piston head; a piston rod having one end connected to the piston head, forming an inner space therein, and having another end at which an opening communicating with the inner space is formed; a wire having one end connected to an electric device mounted on the piston head and extending through the inner space of the piston rod; and a connector disposed at the other end of the piston rod and connected to another end of the wire, wherein the connector includes a socket part rotatably disposed in the opening at the other end of the piston rod, and a plug part inserted into the socket through the opening of the other end of the piston rod, the socket part includes an accommodation part having a cylindrical shape, a guide protrusion is formed on an outer surface of a sidewall of the accommodation part, and the guide protrusion is slidably connected to a rotation guide groove formed on an inner surface of the socket accommodation part.

A portion of the guide protrusion corresponding to one end side of the piston rod may be rounded.

An elongated hole may be formed on the sidewall of the accommodation part.

An insertion prevention protrusion engaged with a lower side of the socket part may be formed inside the piston rod.

The plug part may include a head for closing the opening of the piston rod, and a locking claw engaged with a rim protruding in a radial direction around the opening, and the locking claw may be provided along a lower edge of the head.

The plug part may further include a body extending from a lower side of the head, and a rotation prevention protrusion provided on an outer surface of the body, and the rotation prevention protrusion may be fitted into a groove formed on an inner surface of the socket accommodation part of the piston rod and prevents the rotation of the plug part.

The plug part may further include an insertion plug extending downward from the body, and an insertion part provided in a lower side of the insertion plug. A socket rotation alignment cam surface is formed at a lower end of the insertion part. A orientation alignment inclined surface is formed inside the accommodation part of the socket part. When the insertion part is inserted into the accommodation part, the socket rotation alignment cam surface and the orientation alignment inclined surface may cooperate with each other to rotate the socket part.

DETAILED DESCRIPTION OF EMBODIMENTS

The advantages and features of the present invention and methods for achieving them will become more apparent from the following embodiments that are described in detail in conjunction with the accompanying drawings.

In addition, some embodiments of the present invention will be described below, and however, it should be noted that the present invention is not limited to the following embodiments and can be embodied in different ways without departing from the scope of the present invention, and that the following embodiments are provided only for complete disclosure and thorough understanding of the invention by those skilled in the art. The scope of the present invention will be determined by the appended claims.

In the following description, well-known structural elements, well-known operations and technologies will not be specifically described for simplicity and so as to avoid the obscure interpretation of the subject matters of the present invention.

Throughout the disclosure, like reference characters refer to like elements. The terminology used herein is intended to only describe particular embodiments and is not intended to limit the present invention.

In this specification, the singular forms "a", "an", and "the" are intended to include the plural forms as well, unless the context clearly indicates otherwise. It will be understood that terms such as "comprise", "include", and "have", when used herein, specify the presence of stated elements and operations, but do not preclude the presence or addition of one or more other elements and operations.

Unless otherwise defined, all terms used herein, including technical and scientific terms, have the same meaning as commonly understood by those of ordinary skill in the art to which the present invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
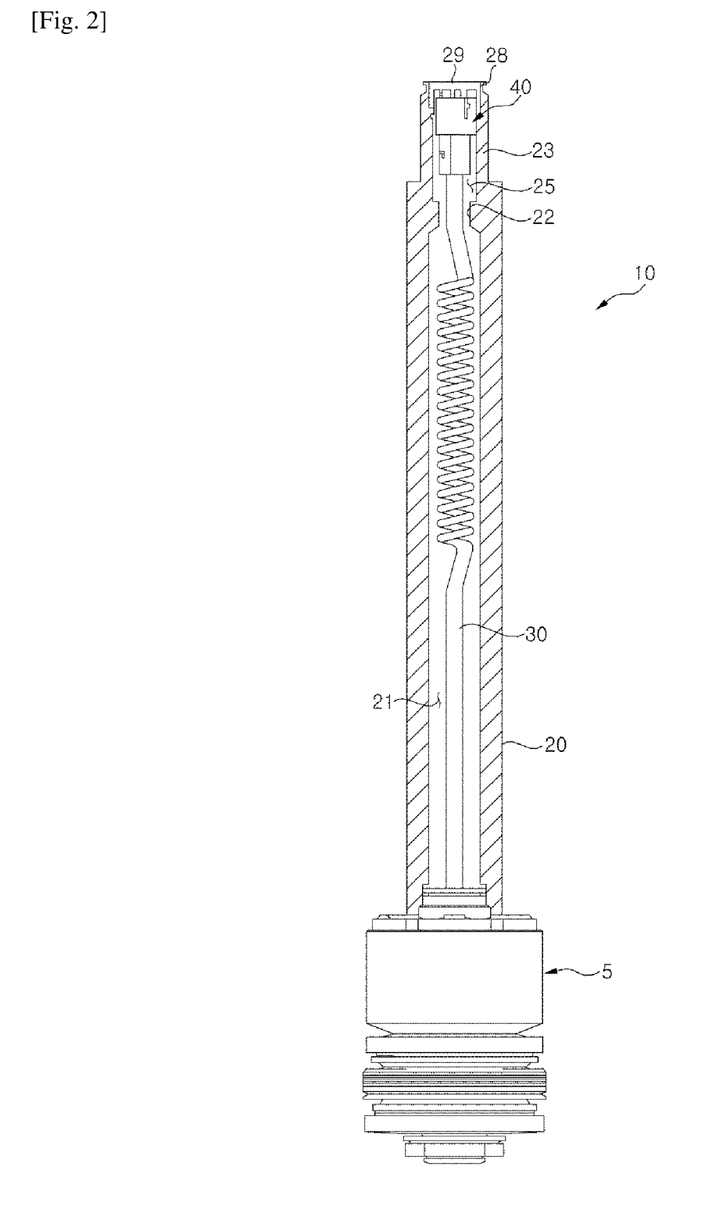
FIG. 2 is a partial sectional view of a piston assembly for a damper according to an embodiment of the present invention.
Figure 3:
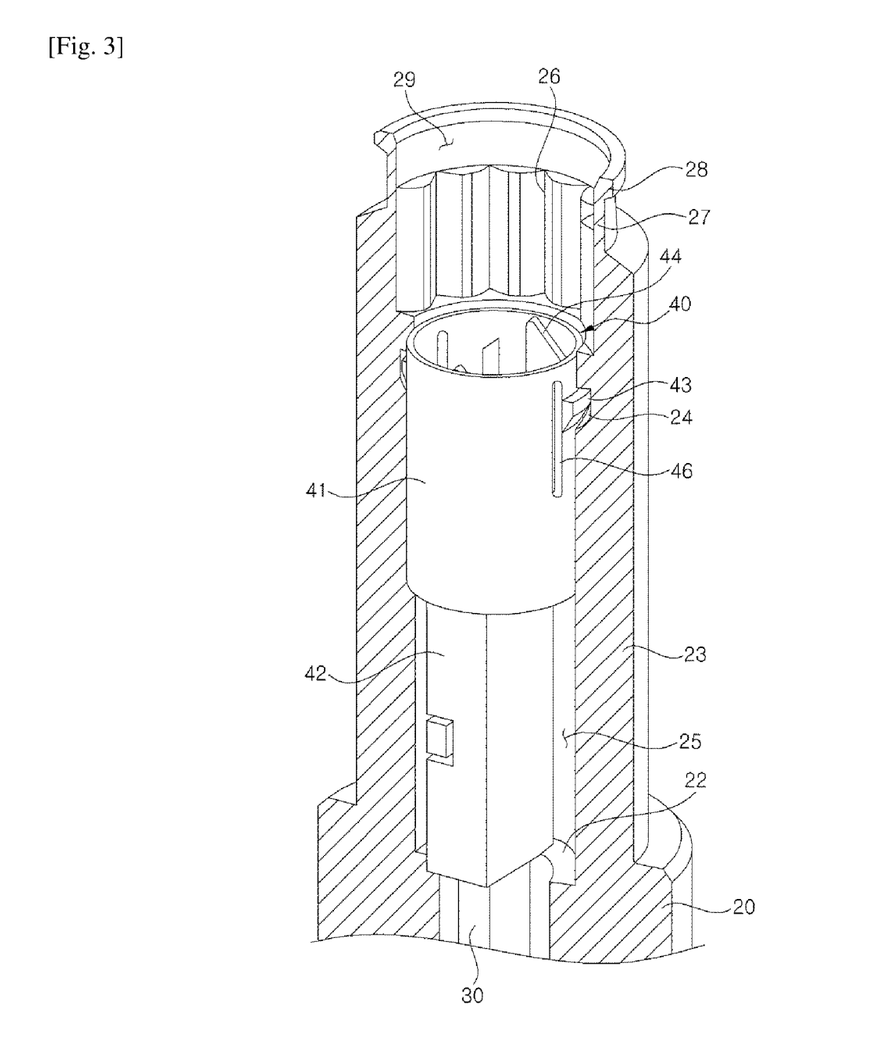
FIG. 3 is a partial sectional perspective view illustrating a state in which a socket part of a wire connector is mounted at an end of a piston rod, according to an embodiment of the present invention.
Figure 4:
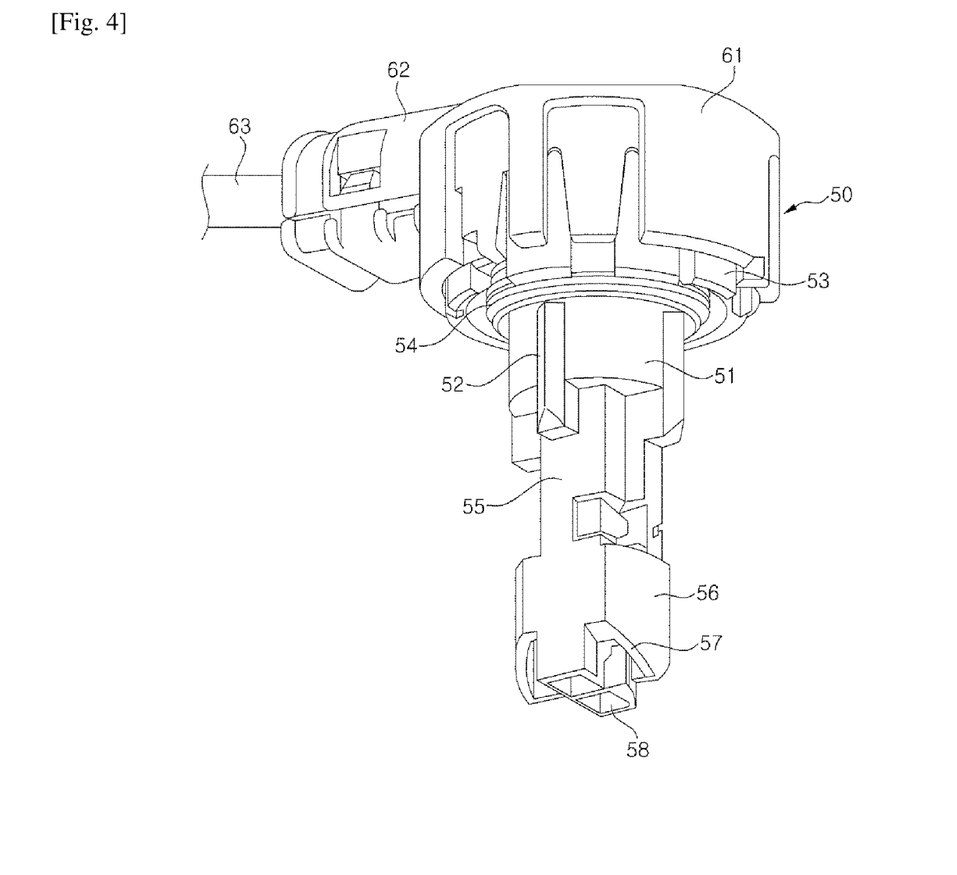
FIG. 4 is a lowerside perspective view of a plug part of the wire connector according to an embodiment of the present invention.

FIG. 2 is a partial sectional view of a piston assembly for a damper according to an embodiment of the present invention, FIG. 3 is a perspective view and a cross-sectional view respectively illustrating a socket part of a connector for a damper and a piston rod on which the socket part is mounted, according to an embodiment of the present invention, and FIG. 4 is a perspective view of a plug part of the connector for the damper, according to an embodiment of the present invention.

As illustrated in FIG. 2, the piston assembly 10 according to an embodiment of the present invention includes a piston head 5, a piston rod 20 having one end connected to the piston head 5, a wire 30 connected to an electric device (not shown), for example, a solenoid, provided in the piston head 5, a socket part 40 connected to the other end of the wire 30 and disposed inside the piston rod 20, and a plug part (50, see FIG. 4) which can be detachably connected to the socket part 40.

The piston assembly 10 according to the embodiment of the present invention may be mounted on, for example, a damping force variable damper or a regeneration damper. For example, in a case where the damper is the damping force variable damper, a passage is formed in the piston head 5, and a valve operated by a solenoid is provided so as to change or block a route of the passage. So, a flow rate of a working fluid flowing through the passage formed in the piston head 5 can be adjusted, and thus a generated damping force may be adjusted.

In addition, for example, in a case where the damper is the regeneration damper, a power generating device capable of generating an electromotive force by a fluid flowing through the passage provided in the piston head 5 may be mounted as an electric device.

The piston rod 20 is hollow with a inner space 21 therein, and the wire 30 having one end connected to the electric device of the piston head 5 extends through the inner space 21. The piston rod 20 has an upper end exposed to the outside of a cylinder constituting the damper. An opening 29 communicating with the inner space 21 is formed at the upper end of the piston rod 20 in which a wire connector including a socket part 40 and a plug part 50 is mounted. In addition, the upper end of the piston rod 20 may be connected to, for example, a body of a vehicle.

The wire 30 has one end connected to, for example, a solenoid or the like mounted on the piston head 5, and extends to the upper end of the piston rod 20 through the inner space 21 of the piston rod 20. The other end of the wire 30 is connected to the socket part 40 of the connector. A portion having a pigtail shape is provided at a portion of the wire 30 extending in the inner space 21, so as to reduce a tension applied to both ends of the wire 30. The wire 30 may be connected to the controller (ECU) of the vehicle through the connector connected to the other end thereof and may be supplied with a current therefrom.

The connector includes the socket part 40 and the plug part 50. The socket part 40 is connected with the other end of the wire 30 and is disposed in the upper side of the piston rod 20. The socket part 40 includes an accommodation part 41 into which an insertion plug 55 of the plug part 50 is inserted, and a wire end connection part 42 connected to a lower side of the accommodation part 41 to hold the other end of the wire 30. The wire end connection part 42 may be formed by molding a resin.

The accommodation part 41 has a cylindrical shape as a whole and provides an inner space into which the insertion plug 55 can be accommodated. The wire end connection part 42 is fixedly connected to the bottom of the accommodation part 41. A plurality of guide protrusions 43 may be provided on an outer surface of a sidewall of the accommodation part 41. The guide protrusion 43 may have a rounded lower surface so as to enable the accommodation part 41 to be inserted into a socket accommodation space 25 through the upper opening 29 of the piston rod 20. That is, the guide protrusions 43 may be slidably connected to a rotation guide groove 24 concavely formed on the inner surface of the upper portion of the piston rod 20.

In addition, in order to enable the guide protrusion 43 to be smoothly fitted into the rotation guide groove 24, an elongated hole 46 extending in an axial direction of the accommodation part 41 may be formed on the sidewall of the accommodation part 41 That is, when the socket part 40 is inserted into the socket accommodation space 25 of the socket accommodation part 23 through the upper opening 29 of the piston rod 20, the guide protrusion 43 is pressed against the inner surface of the socket accommodation part 23, and the sidewall of the accommodation part 41 is resistant to the pressing, but the elongated hole 46 is provided so that the resistance of the sidewall is reduced and the elastic deformation of the sidewall can be made even with a smaller force.

The rotation guide groove 24, into which the guide protrusion 43 is inserted, is concavely formed in the inner wall of the socket accommodation part 23 corresponding to the upper end of the piston rod 20. The rotation guide groove 24 may be formed in a circular shape on a plane perpendicular to the axis of the piston rod 20. The guide protrusion 43 is movable while sliding in the rotation guide groove 24, and thus the accommodation part 41 is rotatable.

A orientation alignment inclined surface 44 is formed on the inner surface of the sidewall of the accommodation part 41. The orientation alignment inclined surface 44 corresponds to a socket rotation alignment cam surface 57 formed at a lower end of the insertion plug 55. That is, when the insertion plug 55 is inserted into the accommodation part 41 through the upper opening 29 of the piston rod 20, the socket rotation alignment cam surface 57 comes into contact with the orientation alignment inclined surface 44 and presses the orientation alignment inclined surface 44 so that the accommodation part 41 is rotated by a predetermined angle.

Due to such a rotation, a terminal insertion port 58, which is opened in a downward direction of the insertion part 56 and into which a terminal (not shown) protruding from the bottom surface of the accommodation part 41 of the socket part 40 is inserted, is aligned with the terminal so that the terminal is smoothly inserted into the terminal insertion port 58.

As illustrated in FIG. 3, the orientation alignment inclined surface 44 may be formed to be inclined with respect to a longitudinal axis of the accommodation part 41, and may be a side surface of a protrusion protruding from the inner surface of the sidewall of the accommodation part 41.

The plug part 50 includes a head 61 for closing the opening 29 when inserted into the opening 29 of the upper end of the piston rod 20, and a body 51 extending downward from the head 61 and inserted into the opening 29.

The head 61 may be formed by molding a resin, and a plurality of locking claws 53 extending downward may be formed in a lower peripheral portion. When the head 61 is inserted into the opening 29, the locking claw 53 is engaged with a rim 28 extending outward from the upper end of the piston rod 20 in a radial direction, and fixes the head 61 to the end of the piston rod 20.

In addition, a sealing protrusion 54 coming into contact with an inner surface of the rim 28 when the head 61 is inserted into the opening 29 may be provided on an inner side in a radial direction from the locking claw 53.

Therefore, the head 61 may be airtightly or watertightly connected to the opening 29 by the locking claws 53 and the sealing protrusion 54.

A rotation prevention protrusion 52 is provided on an outer surface of the body 51 extending from the lower side of the head 61. The rotation prevention protrusion 52 is engaged with a groove 26 formed in an upper portion of the inner surface of the socket accommodation part 23 corresponding to the upper end of the piston rod 20, such that the head 61 is movable in a longitudinal direction of the piston rod 20, but the rotation of the head 61 is prevented. The rotation prevention protrusion 52 may be formed on the outer surface of the body 51 in parallel to the longitudinal direction of the piston rod 20. When the head 61 is inserted into the opening 29, the rotation prevention protrusion 52 is moved along the groove 26 provided in the upper portion of the socket accommodation part 23 in a length direction of the piston rod 20, but the rotation thereof is prevented.

Since the head 61 is connected to the upper end of the piston rod 20 such that the rotation thereof is prevented, the rotation of the head 61 may be prevented even if an external wire 63 connected to the head 61 through a wire end connection part 62 is shaken. In addition, when the head 61 is inserted into the socket accommodation part 23, the insertion plug 55 is not rotated, and only the accommodation part 41 can be rotated within the socket accommodation part 23 by the socket rotation alignment cam surface 57 and the orientation alignment inclined surface 44 of the socket part 40.

The insertion plug 55 may extend from the lower side of the body 51 in parallel to the longitudinal direction of the piston rod 20. An electric wire or the like may extend from the external wire 63 in the insertion plug 55, and a conductive electrode electrically connectable to a terminal (not shown) of the socket part 40 may be provided.

An insertion part 56 may be provided in a lower portion of the insertion plug 55. The insertion part 56 is inserted into the accommodation part 41 of the socket part 40. The socket rotation alignment cam surface 57 interacting with the orientation alignment inclined surface 44 can be formed in the insertion part 56. In addition, the terminal insertion port 58 for accommodating and guiding the terminal of the socket part 40 to the electrode is formed in a lower portion of the insertion part 56.

The opening 29 connected to the inner space 21 is provided at the upper end of the piston rod 20 on which the connector including the socket part 40 and the plug part 50 is mounted. The rim 28 protruding outward in a radial direction is provided around the opening 29. As described above, the locking claw 53 of the head 61 may be engaged with the rim 28. In addition, a thin wall part 27 is formed below the rim 28 so that the locking claws 53 are smoothly engaged with the rim 28.

A longitudinal groove 26 may be formed on the inner surface of the socket accommodation part 23 disposed just below the opening 29 in parallel to the longitudinal direction of the piston rod 20, so that the rotation prevention protrusion 52 formed on the outer surface of the body 51 of the plug part 50 is fitted therein. Therefore, the rotation of the plug part 50 can be prevented when the plug part 50 is inserted through the opening 29 and after it has been inserted thereinto.

The accommodation part 41 of the socket part 40 may be disposed below the longitudinal groove 26, and the rotation guide groove 24 into which the rotation guide protrusion 43 is inserted may be formed, thereby allowing the rotation of the accommodation part 41 around the longitudinal axis of the piston rod 20.

An insertion prevention protrusion 22 for preventing the socket part 40 from being inserted into the inner space 21 of the piston rod 20 may be provided at a lower end of the socket accommodation space 25 which is the inner space of the socket accommodation part 23.

In the connector and the piston rod of the piston assembly including the same according to the embodiments of the present invention, the plug part 50 may be easily connected to the upper end of the piston rod 20, and the rotation of the plug part 50 is prevented, thereby further improving the airtightness between the plug part 50 and the opening 29 of the upper end of the piston rod. In addition, the operator may determine and fix the orientation of the external wire 63 and the wire end connection part 62 extending outward from the head 61 of the plug part 50.

In the embodiments described above, the socket part 40 is rotatably disposed in the socket accommodation space 25 by the guide protrusion 43 inserted into the rotation guide groove 24, but the present invention is not limited thereto. The present invention may include another structure, for example, a structure such as a bearing disposed between the accommodation part 41 and the socket accommodation part 23.

In addition, in the embodiments described above, a self-alignment structure provided in the socket part 40 and the plug part 50, that is, a structure that rotates the socket part 40 such that the socket part 40 is aligned at a predetermined rotation position with respect to the plug part 50 when the plug part 50 is inserted into the socket part 40, is configured by the socket rotation alignment cam surface 57 and the orientation alignment inclined surface 44, but the present invention is not limited thereto. For example, the socket rotation alignment cam surface may be formed on not the end of the insertion part 56 but the outer side of the insertion part 56, and the orientation alignment inclined surface 44 may be formed at the upper end of the socket part 40 so as to cooperate with the socket rotation alignment cam surface formed at the outer side of the insertion part 56.

It should be understood that these embodiments are provided for illustration only and are not to be construed in any way as limiting the present invention, and that the scope of the present invention is defined only by the accompanying claims. All modifications, changes, and alterations deduced from the claims and their equivalents fall within the scope of the present invention.

DESCRIPTION OF REFERENCE NUMERALS

5: piston head
10: piston assembly
20: piston rod
21: inner space
22: insertion prevention protrusion
23: socket accommodation part
24: rotation guide groove
25: socket accommodation space
26: longitudinal groove
27: thin wall part
30: wire
40: socket
41: accommodation part
42: wire end connection part
43: rotation guide protrusion
44: orientation alignment inclined surface
46: elongated hole
50: plug part
51: body
52: rotation prevention protrusion
53: locking claw
54: sealing protrusion
55: insertion plug
56: insertion part
57: socket rotation alignment cam surface
58: terminal insertion port
61: head
62: external wire end connection part
63: external wire

What is claimed is:

1. A piston assembly for a damper, comprising:
   a piston head;
   a piston rod having one end connected to the piston head, forming an inner space therein, and having another end at which an opening communicating with the inner space is formed;
   a wire having one end connected to an electric device mounted in the piston head and extending through the inner space of the piston rod; and
   a connector disposed at the other end of the piston rod and connected with another end of the wire,
   wherein the connector comprises a socket part rotatably disposed in the opening at the other end of the piston rod, and a plug part inserted into the socket through the opening of the other end of the piston rod, and
   a self-alignment structure is provided in the socket part and the plug part and is configured to rotate the socket part such that the socket part is aligned at a predetermined orientation with respect to the plug part when the plug part is inserted into the socket part.

2. The piston assembly according to claim 1, wherein the socket part is disposed in a socket accommodation space of a socket accommodation part formed at the other end of the piston rod,
   the socket part comprises an accommodation part having a cylindrical shape,
   a guide protrusion is formed on an outer surface of a sidewall of the accommodation part, and
   the guide protrusion is slidably connected to a rotation guide groove formed on an inner surface of the socket accommodation part.

3. The piston assembly according to claim 2, wherein a portion of the guide protrusion corresponding to the one end side of the piston rod is rounded.

4. The piston assembly according to claim 3, wherein an elongated hole is formed on the sidewall of the accommodation part.

5. The piston assembly according to claim 4, wherein an insertion prevention protrusion engaged with a lower side of the socket part is formed inside the piston rod.

6. The piston assembly according to claim 1, wherein the plug part comprises a head for closing the opening of the piston rod, and a locking claw engaged with a rim protruding in a radial direction around the opening, and
   the locking claw is provided along a lower edge of the head.

7. The piston assembly according to claim 6, wherein the plug part further comprises a body extending from a lower side of the head, and a rotation prevention protrusion provided on an outer surface of the body, and the rotation prevention protrusion is fitted into a groove formed on an inner surface of the socket accommodation part of the piston rod and prevents the rotation of the plug part.

8. The piston assembly according to claim 1, wherein the self-alignment structure comprises a socket rotation alignment cam surface formed at a portion of the plug part inserted into the socket part, and a orientation alignment inclined surface formed on an inner surface of the socket part.

* * * * *